UNITED STATES PATENT OFFICE.

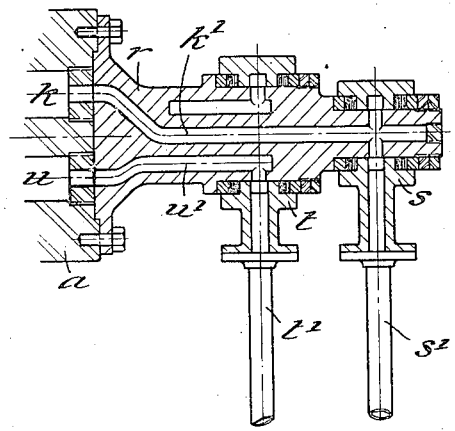
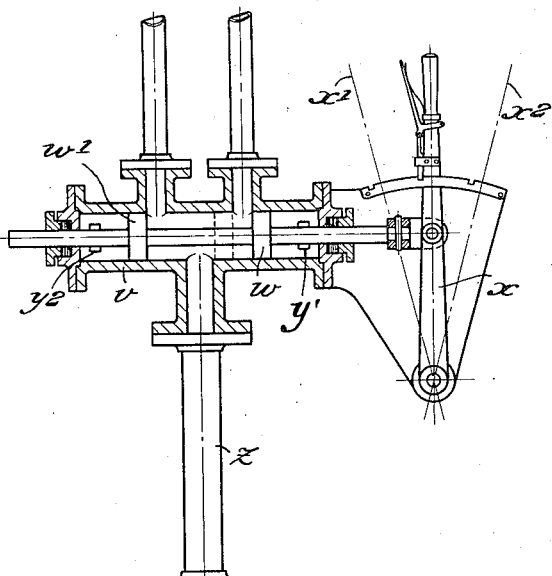
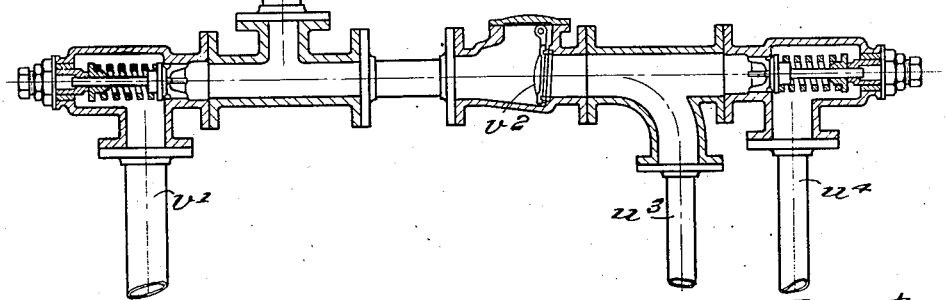
Fig. 2.

BERNARD R. WINGFIELD, OF WEST DRAYTON, ENGLAND.

POWER-TRANSMISSION TOOTHED GEARING.

1,351,597.

Specification of Letters Patent. Patented Aug. 31, 1920.

Application filed August 6, 1918. Serial No. 248,639.

*To all whom it may concern:*

Be it known that I, BERNARD ROBERT WINGFIELD, a subject of the King of Great Britain, residing in West Drayton, England, have invented certain new and useful Improvements in and Relating to Power-Transmission Toothed Gearing, of which the following is a specification.

My invention which is applicable to power installations generally but more particularly to those driving ships' propellers, relates to a reducing gear for driving a shaft in either direction in which the driving shaft rotates continuously in the same direction and drives the driven shaft in one direction through a toothed wheel having external teeth and in the other direction through a toothed wheel having internal teeth. These driven wheels are mounted free to rotate on the driven shaft and are coupled thereto suitably with the direction of rotation required.

The invention consists in an improved arrangement and combination of parts as hereinafter described and claimed.

Fig. 2 is a plan to an enlarged scale of an arrangement of valves for controlling introduction of pressure fluid through the shaft for operating the clutches.

Figure 1:
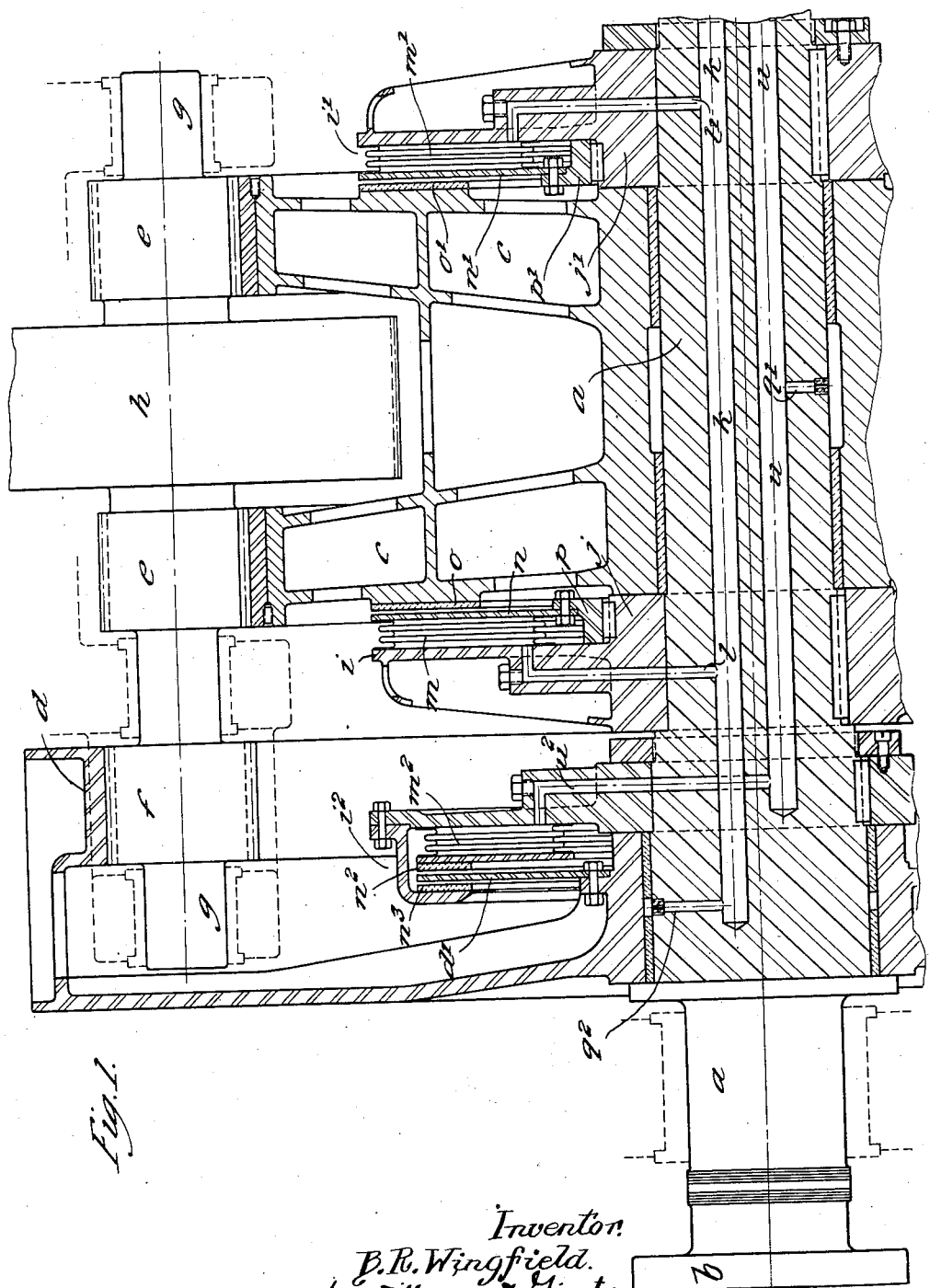
Figure 1 is a part plan of the gear.

In this case the wheels on the driven shaft are free to rotate on the shaft and are adapted to be coupled thereto by hydraulically operated clutches; they are driven by corresponding pinions fast on the driving shaft which is duplicated in well-known manner.

$a$ is the driven shaft of a turbine double reduction gear for ship propulsion. It is flanged at $b$ for connection with the propeller shaft, a suitable thrust bearing being interposed between this flange and the propeller. $c$ is the final gear wheel for the "ahead" direction of rotation and has external teeth while $d$ the final gear wheel for the "astern" direction of rotation, has internal teeth. Both wheels are free to turn on shaft $a$ but cannot slide thereon. The wheel $c$ is in two parts, and the parts are engaged respectively by pinions $e$ on shaft $g$ which also carries pinion $f$ driving the wheel $d$. Pinions $e$ and $f$ are mounted fast on, or forged in one with, the shaft $g$. Each shaft $g$ is driven through a wheel $h$ mounted between the two parts of wheel $c$, by a separate turbine. This double reduction by means of wheels $h$ would not be necessary if low speed motors were used instead of turbines in which case these wheels would be omitted and shafts $g$ driven directly by the motors.

Two hydraulically operated clutches $i$, $i'$ are provided for coupling the wheel $c$ to its shaft, one at each end of the nave of the two-part wheel, so that by their opposed pressure axial thrust from the clutch members is avoided. The pressure fluid introduced through passage $k$ in the shaft passes through passages $l$, $l'$ into the extensible fluid pressure chambers, $m$, $m'$ where it forces friction clutch disks $n$, $n'$ against friction surfaces $o$, $o'$ on the wheel $c$. The bosses $j$, $j'$ of the friction clutches are keyed to shaft $a$, while the bosses $p$, $p'$ to which disks $n$, $n'$ are bolted respectively are mounted on keys on bosses $j$, $j'$ so that the disks can slide axially. A similarly operated clutch, as will presently be described, serves to couple wheel $d$ to the shaft.

Whenever wheel $c$ is clutched to the shaft, wheel $d$ is running free thereon and vice versa. The invention includes an arrangement whereby the two wheels cannot be coupled to the shaft by their respective clutches at the same time and for using the pressure fluid for lubricating the freely running wheel. A further arrangement permits use of the pressure fluid for lubricating both wheels, when both are freely running.

These arrangements are illustrated in Fig. 2. $r$ is a cylindrical body bolted to the end of shaft $a$ so that passages $k'$ and $u'$ which it contains register with passages $k$ and $u$ respectively in the shaft. Flanged sleeves $s$ and $t$ form running joints with body $r$ and serve for introduction of pressure fluid into passages $k'$, $u'$ respectively through pipes $s'$, $t'$, controlled by valve $v$. The latter comprises two pistons $w$, $w'$ mounted on a rod connected with a lever $x$. In the position of this lever shown in the drawing, both pistons are in their middle position in which pipes $s'$, $t'$, and therefore passages $k'$, $u'$ and $k$, $u$, are both open to the exhaust $z$. When the lever is moved into position $x'$, the pistons are in their extreme left hand position, wherein $w'$ still leaves pipe $t'$ open to exhaust, but piston $w$ (the new position of which is shown in dotted lines) has cut off pipe $s'$ from the exhaust and has opened into the pressure fluid inlet port $y'$. When the lever is moved into position $x^2$ the pistons are in their extreme right hand position and $w$ has opened pipe $s'$ to the exhaust while $w'$ has cut off pipe $t'$ from the exhaust and opened it to inlet port $y^2$. It is to be noted that the pistons $w$ and $w'$ are so arranged that the former cuts off pipe $s'$ from the inlet port $y'$ and opens it to the exhaust $z$ before piston $w'$ opens pipe $t'$ to the inlet port $y^2$, and vice versa: thus it is impossible for pressure to be maintained in both pipes at the same time.

Referring to Fig. 1, passage $u$ in shaft $a$ is connected through passage $u^2$ with the pressure chamber $m^2$ of the clutch $i^2$ which is slidably mounted on a key on shaft $a$. When the pressure fluid passes into this chamber it forces plate $n^2$ against plate $d'$ which is bolted to the nave of wheel $d$ and then the pressure fluid acting on the opposite end of the chamber moves the clutch $i^2$ to the right hand (in Fig. 1) bringing the friction clutch disk or plate $n^3$ against the other or left face of plate $d'$, thus coupling the wheel to the shaft, but with balanced axial pressure.

As already stated a like effect follows passage of pressure fluid from passage $k$ into clutches $m$, $m'$. It will be noted that passage $u$ is connected by passage $q'$ with the surface of contact of wheel $c$ with shaft $a$ and that passage $k$ is connected with the like surface of wheel $d$ through passage $q^2$. In this manner, whenever wheel $c$ is fast to the shaft and wheel $d$ is running free lubricant is supplied to the latter through $q^2$, while when wheel $d$ is fast and wheel $c$ free, lubricant is supplied to $c$ through $q'$.

By following what has been stated with reference to the passage and control of the fluid pressure, it will be seen that the position $x'$ of lever $x$ is that for steaming ahead, namely with pressure fluid operating clutches $m$, $m'$ and lubricating wheel $d$, while the position $x^2$ is that for going astern, namely with pressure fluid operating clutch $i^2$ and lubricating wheel $c$.

In the middle position of $x$ all clutches are open to the exhaust and both wheels are running free, so that although pressure fluid is not in use for operating a clutch it is still required for lubricating the wheels.

For this purpose the exhaust pressure in $z$ is maintained high enough to insure lubrication, but below that necessary for operating a clutch. The exhaust contains a relief valve $v'$ which allows the fluid leaving a clutch to flow until the pressure is below a certain predetermined value, whereupon this valve closes and the remaining oil in the clutch flows through passages $q'$ and $q^2$. As soon as the pressure is slightly further reduced by escape from the lubricated surfaces, a check valve $v^2$ is opened by an auxiliary supply of fluid, under an intermediate pressure, flowing through pipe $u^3$ and exhausting through pipe $u^4$.

The particular construction shown is only an example of the invention. It will be apparent that the wheel with external teeth, and that with internal teeth may be driven by a single pinion on the driving shaft. It is also practicable to control valve $v$ from a distance in any known manner, such as by fluid pressure or by an electric current.

Having now particularly described and ascertained the nature of my said invention and in what manner the same is to be performed, I declare that what I claim is:—

1. A reducing gear for driving a shaft in either direction of rotation from a shaft rotating continuously in one direction, comprising a wheel having external teeth and a wheel having internal teeth both mounted on the shaft to be driven, pinions on the driving shaft gearing with the said toothed wheels, the gears on one of the shafts being fast on that shaft while the co-acting gears on the other shaft are mounted freely thereon, hydraulically operated clutches adapted to couple the free gear wheels alternatively to their shaft, and valve gear controlling the operation of the clutches and the supply of a lubricating fluid film to the gear wheels, substantially as described.

2. A reducing gear for driving a shaft in either direction of rotation from a shaft rotating uni-directionally, comprising an externally toothed gear wheel and an internally toothed gear wheel both loosely mounted on the shaft to be driven, pinions fast on the driving shaft meshing with the said gear wheels, hydraulically actuated clutch devices for the two gear wheels rotatably secured to the driven shaft but having axial freedom thereon, a system of ducts connecting the clutch devices with a source of pressure fluid, and valve gear controlling the supply of pressure fluid and operating to actuate the clutch devices alternatively and simultaneously supply a lubricating film of pressure fluid to the unclutched gear wheel, substantially as described.

In testimony whereof I have signed my name to this specification.

BERNARD R. WINGFIELD.

Witnesses:
E. CHARLES WAY,
S. COWLES.